US007239963B2

(12) United States Patent
Suzuki

(10) Patent No.: US 7,239,963 B2
(45) Date of Patent: Jul. 3, 2007

(54) METHOD AND APPARATUS FOR DISPLAYING NAVIGATION INFORMATION

(75) Inventor: Keizo Suzuki, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 26 days.

(21) Appl. No.: 10/648,067

(22) Filed: Aug. 25, 2003

(65) Prior Publication Data
US 2004/0088110 A1    May 6, 2004

(30) Foreign Application Priority Data
Aug. 26, 2002    (JP)    ............................. 2002-244534

(51) Int. Cl.
*G06F 17/30* (2006.01)
*G01C 21/26* (2006.01)
(52) U.S. Cl. .......................... 701/211; 707/200; 707/5; 707/203; 701/200; 701/213; 701/208; 701/214; 340/934; 340/995.14; 340/435
(58) Field of Classification Search ................ 701/211, 701/200, 207, 208, 213–215, 223, 202; 340/990, 340/995, 934, 995.1, 435; 705/26; 707/102, 707/5, 200, 203; G01C 21/00; G06F 3/00; G08G 1/96; G08B 29/00
See application file for complete search history.

(56) References Cited

U.S. PATENT DOCUMENTS

| 4,210,961 A | * | 7/1980 | Whitlow et al. ................ 707/7 |
| 5,177,685 A | * | 1/1993 | Davis et al. ............. 455/456.5 |
| 5,689,650 A | * | 11/1997 | McClelland et al. ...... 705/36 R |
| 6,047,234 A | * | 4/2000 | Cherveny et al. ............ 701/200 |
| 6,201,497 B1 | * | 3/2001 | Snyder et al. ......... 342/357.06 |
| 6,230,098 B1 | * | 5/2001 | Ando et al. ................. 701/208 |
| 6,283,412 B1 | * | 9/2001 | Mango ................... 244/135 R |
| 6,317,718 B1 | * | 11/2001 | Fano ............................. 705/1 |

(Continued)

FOREIGN PATENT DOCUMENTS

CN    1380627 A    * 11/2002

(Continued)

OTHER PUBLICATIONS

Longaker, Differential navigation system for remote mobile users . . . , computed differential data to commercial geosynchronous earth satellite relay, Derwent-ACC-No. 1988-183065, Jun. 14, 1988.*

(Continued)

*Primary Examiner*—Cuong Nguyen
(74) *Attorney, Agent, or Firm*—Brinks Hofer Gilson & Lione

(57) ABSTRACT

A vehicle navigation apparatus enabling a user to know whether a data item for display is the latest updated one or has old contents, thereby allowing him/her to confidently drive according to a guidance route provided by navigation. The vehicle navigation apparatus is adapted to update a database by receiving difference data. The navigation apparatus displays not only the data item for display but also freshness information on the data, based on the difference data and storage contents in the pre-update database. The freshness information may indicate whether the freshness of the data item for display is guaranteed or not, and may be displayed in a manner according to the freshness of the data item.

17 Claims, 8 Drawing Sheets

U.S. PATENT DOCUMENTS

| | | | |
|---|---|---|---|
| 6,336,073 B1 * | 1/2002 | Ihara et al. | 701/202 |
| 6,516,267 B1 * | 2/2003 | Cherveny et al. | 701/208 |
| 6,546,334 B1 * | 4/2003 | Fukuchi et al. | 701/208 |
| 6,549,847 B2 * | 4/2003 | Ikeuchi et al. | 701/208 |
| 6,609,114 B1 * | 8/2003 | Gressel et al. | 705/50 |
| 6,720,920 B2 * | 4/2004 | Breed et al. | 342/386 |
| 6,768,944 B2 * | 7/2004 | Breed et al. | 701/301 |
| 6,816,869 B2 * | 11/2004 | Kagalwala et al. | 707/103 R |
| 6,820,135 B1 * | 11/2004 | Dingman et al. | 709/246 |
| 6,853,913 B2 * | 2/2005 | Cherveny et al. | 701/208 |
| 6,856,970 B1 * | 2/2005 | Campbell et al. | 705/35 |
| 7,072,764 B2 * | 7/2006 | Donath et al. | 701/200 |
| 7,085,637 B2 * | 8/2006 | Breed et al. | 701/38 |
| 7,110,880 B2 * | 9/2006 | Breed et al. | 701/207 |
| 2002/0184111 A1 * | 12/2002 | Swanson | 705/26 |
| 2002/0198632 A1 * | 12/2002 | Breed et al. | 701/1 |
| 2003/0009430 A1 * | 1/2003 | Burkey et al. | 707/1 |
| 2003/0125871 A1 * | 7/2003 | Cherveny et al. | 701/208 |
| 2003/0149981 A1 * | 8/2003 | Finster et al. | 725/46 |
| 2003/0154211 A1 * | 8/2003 | Kasahara | 707/102 |
| 2003/0191568 A1 * | 10/2003 | Breed | 701/36 |
| 2004/0088110 A1 * | 5/2004 | Suzuki | 701/211 |
| 2005/0060069 A1 * | 3/2005 | Breed et al. | 701/29 |
| 2005/0091118 A1 * | 4/2005 | Fano | 705/26 |
| 2005/0093720 A1 * | 5/2005 | Yamane et al. | 340/995.13 |
| 2005/0134440 A1 * | 6/2005 | Breed | 340/435 |
| 2005/0137786 A1 * | 6/2005 | Breed et al. | 701/200 |
| 2005/0149259 A1 * | 7/2005 | Cherveny et al. | 701/208 |
| 2006/0206256 A1 * | 9/2006 | Kumagai et al. | 701/117 |
| 2007/0021915 A1 * | 1/2007 | Breed et al. | 701/301 |

FOREIGN PATENT DOCUMENTS

| | | | |
|---|---|---|---|
| DE | 3720427 A | * | 12/1987 |
| DE | 19842430 A1 | * | 3/1999 |
| JP | 11237250 A | * | 8/1999 |
| JP | 11257975 A | * | 9/1999 |
| JP | 2001075967 A | * | 3/2001 |
| JP | 2001331493 A | * | 11/2001 |
| JP | 2002032773 A | * | 1/2002 |
| JP | 2004258406 A | * | 9/2004 |
| WO | WO 2006036958 A1 | * | 4/2006 |

OTHER PUBLICATIONS

TDB-Account-No. NN9012177, Dec. 1, 1990, Browsing: A novel facility for exploring the contents of a datastore, IBM Technical Bulletin, Dec. 1990, vol. 33, issue 7, pp. 177-180.*

C. B. Harris et al., Digital map dependent functions of automatic vehicle location systems, IEEE Position and Location Symposium, pp. 79-87, 1988, IEEE.*

E. P. Neukirchner et al., Digital Maps databases for autonomous vehicle navigation systems, IEEE Position and Location Symposium, pp. 320-324, 1986, IEEE 86CH2365-5.*

Matthew McGranaghan et al., Automated provision of navigation assistance to drivers, The American cartographer 14(2):121-138, 1987.*

J. W. Sinko et al., Centimeter-level GPS for highway systems, SRI International, Jul. 1998.*

* cited by examiner

FIG.5

| LIST OF SEARCH RESULT | | |
|---|---|---|
| AAA SHOP | NEW | FRESHNESS: GUARANTEED |
| BBB STORE | | FRESHNESS: NOT GUARANTEED |
| CCC BOOK STORE | | FRESHNESS: GUARANTEED |
| DDD SHOP | | FRESHNESS: NOT GUARANTEED |
| EEE BOOK MART | NEW | FRESHNESS: GUARANTEED |

| LIST OF SEARCH RESULT | GUARANTEED RELIABILITY |
|---|---|
| AAA SHOP | LOW — NEW — HIGH ▽ |
| BBB STORE | ▽ |
| CCC BOOK STORE | ▽ |
| DDD SHOP | ▽ |
| EEE BOOK MART | NEW ▽ |

LIST OF SEARCH RESULT

| Ⓝ AAA SHOP |
| O BBB STORE |
| ◯ CCC BOOK STORE |
| O DDD SHOP |
| Ⓝ EEE BOOK MART |

LIST OF SEARCH RESULT

| AAA SHOP | 2002/2/12 | NEW |
| BBB STORE | 2001/2/1 | |
| CCC BOOK STORE | 2002/2/22 | |
| DDD SHOP | 2002/2/12 | |
| EEE BOOK MART | 2001/11/15 | NEW |

LIST OF SEARCH RESULT

| NAME ▽ | DATE ▽ | FRESHNESS ▽ |
|---|---|---|
| AAA SHOP | 2002/2/12 | NEW |
| BBB STORE | 2001/2/1 | |
| CCC BOOK STORE | 2002/2/22 | |
| DDD SHOP | 2002/2/12 | |
| EEE BOOK MART | 2001/11/15 | NEW |

41    45    42

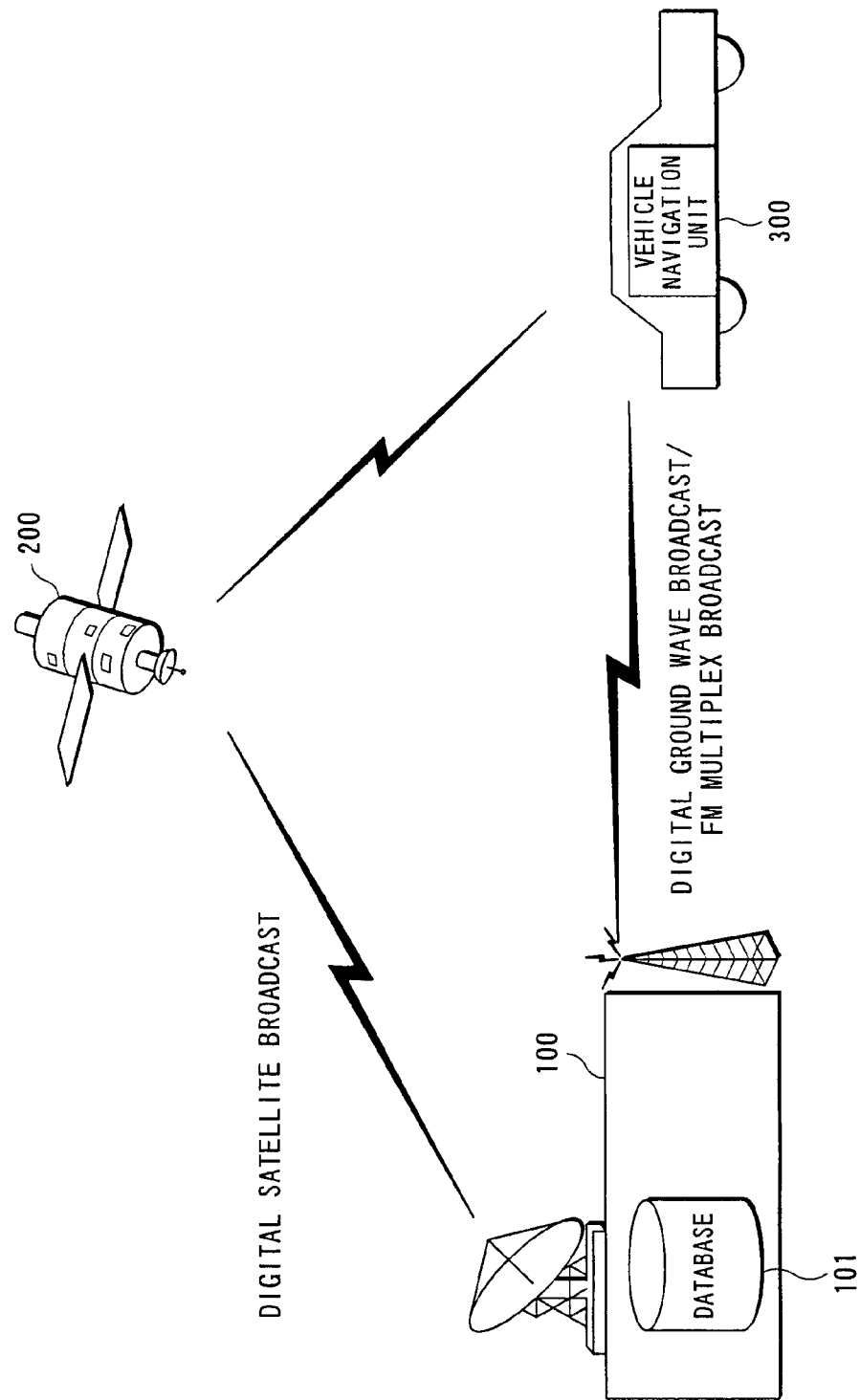

METHOD AND APPARATUS FOR DISPLAYING NAVIGATION INFORMATION

BACKGROUND OF THE INVENTION

1. Field of the Invention

The present invention relates to a vehicle navigation apparatus and a navigation information displaying method and program. More particularly, the invention relates to vehicle navigation technology that updates a database by receiving difference data.

2. Description of the Related Art

Conventionally, a database for navigation stores map information for use in a vehicle navigation apparatus in a recording medium such as a CD-ROM or a DVD, which is commercially available. A user purchases and uses a recording medium that stores the navigation database, thereby updating a database already installed in his/her own vehicle navigation apparatus. In particular, the updating state of POI (Point of Interest) data, which is included in the map information, concerning different categories such as a shop, bank, gas station, restaurant, hotel, or parking lot, can merely be confirmed by a version value indicative of update information about the recording medium.

Recently, an economical method of updating method of a database in a vehicle navigation apparatus has become mainstream. This method calls for reading difference POI data from a recording medium, which stores therein only the updated difference POI data selected from the whole navigation database. FIG. 12 shows general transmission of difference POI data. As shown in the figure, a database transmission base station 100 transmits difference POI data stored in a database 101 on the database transmission base. Services to transmit or send the difference POI data to a vehicle navigation unit 300 mounted on a vehicle, employing different transmission methods have been proposed. In one transmission method, a digital satellite broadcast is used to transmit the difference POI data from the base station 100 to the navigation unit 300 via a satellite 200. In another method, the transmission of the difference POI data from the base station 100 is conducted using a digital ground wave broadcast or a FM multiplex broadcast.

In the above methods shown in FIG. 12, because all POI difference data for wide areas is to be updated, enormous amounts of data have to be received, thus taking a long time to finish downloading at a time. For example, when POI data to be updated in U.S.A. during one year is updated by using the XM satellite radio, it will take 100 hours. Further, one third of the whole POI data is updated every year. In such a situation, downloading of the data at a time is practically impossible. In consideration of accidentally unread data and the like, if the satellite radio is used for practice, it will take much more time than the downloading time. Even though POI difference data is read from a low-priced recording medium, which stores therein the only POI difference data, to cause a database to be updated, the time lag between updating time of the database and purchase time of the medium occurs without exception.

Thus, users normally utilize databases which are not completely updated, so that search processing is performed as one of navigation functions based on the databases at the timing of not-completed updating.

When using a database that is not completely updated, if data including POI data obtained from search processing has already been updated, it is the latest. However, if it is not updated yet, the data has the old contents. This makes it impossible for the user to judge or determine whether the data obtained from the search processing has the latest contents or not, disadvantageously leading to poor reliability in a navigation apparatus.

SUMMARY OF THE INVENTION

An object of the present invention is to provide a vehicle navigation apparatus with high reliability that enables confident driving according to a guidance route obtained by navigation, a navigation information displaying method therefor, and a program for carrying out the same.

According to a preferred embodiment of the present invention, there is provided a vehicle navigation apparatus that is adapted to update a database by receiving difference data, comprising means for displaying an item of data for display and freshness information on the data, based on the difference data and storage contents in the pre-update database. The display of the freshness information on the data as well as the data item for display enables a user to know whether the data item to be displayed is the latest updated one or has old contents, thus permitting him/her to confidently drive according to a guidance route provided by navigation.

In the vehicle navigation apparatus described above, for example, the freshness information includes information indicative of freshness of the data item for display. This allows the user to confidently drive according to the guidance route provided by the navigation based on the displayed freshness.

In the vehicle navigation apparatus described above, for example, the freshness information indicates whether the freshness of the data item for display is guaranteed or not, and is displayed in a manner according to the freshness of the data item. This enables the user to confidently drive according to the guidance route provided by the navigation, using the displayed data item.

In the vehicle navigation apparatus described above, for example, the freshness information includes information indicating whether the data item for display is an additional item of information. This permits the user to comfortably drive according to the guidance route provided by the navigation without anxiety.

The above-mentioned vehicle navigation apparatus, for example, further comprises extracting means (which corresponds a CPU 11 described later) for searching for a data item specified through the database to extract the data item, judging means (which corresponds to a POI data processor 20 described later) for judging whether the data is in the latest version or not every data item, and means (which corresponds to a display controller 17 described later) for generating a display screen by adding the freshness information on the data item according to a result of the judgment every data item.

In a presently preferred embodiment, such as in the vehicle navigation apparatus described above, the above-mentioned means includes means for generating a list including the data item, the freshness information indicating whether the freshness is guaranteed or not for every data item, and the freshness information indicating whether the data is additional data or not for every data item. This structure may correspond to that of a preferred embodiment described later as shown in FIG. 5.

In the vehicle navigation apparatus described above, the above-mentioned means also includes means for generating a list including the data item and freshness information displayed in bar form for indicating the degree of the freshness every data item. This structure may correspond to that of a preferred embodiment described later as shown in FIG. 6. A means includes means for generating the data item, freshness information displayed in color according to the degree of the freshness every data item, and the freshness information indicating whether the data is additional data or not for every data item may also be included. This structure may correspond to that of a preferred embodiment described later as shown in FIG. 7. Further, in a preferred embodiment, the vehicle navigation apparatus may include a means for generating a list including the data item displayed in a different display position according to the freshness, and the freshness information indicating whether the data is additional data or not for every data item. This structure may correspond to that of a preferred embodiment described later as shown in FIG. 8.

In another preferred embodiment, the vehicle navigation apparatus may include a means for generating a list including the data item and freshness information displayed by an icon of size according to the freshness. This structure may correspond to that of a preferred embodiment described later as shown in FIG. 9. Also, the vehicle navigation apparatus may include a means for generating a list including the data item, freshness information on a date of updating on the database every data item, and the freshness information indicating whether the data is an additional item of information. This structure may correspond to that of a preferred embodiment described later as shown in FIG. 10.

In yet another preferred embodiment, the vehicle navigation apparatus may sort the data items for display and the freshness information on the data in compliance with a predetermined rule to display them. This structure may correspond to that of a preferred embodiment described later as shown in FIG. 11. Further, in the above vehicle navigation apparatus, the data item may comprise POI (Point of Interest) data.

According to the presently preferred embodiment of the invention, a navigation information displaying method is provided, comprising the acts of: receiving difference data to update a database; displaying an item of data for display, and displaying freshness information, based on the difference data and storage contents in pre-update existing database. The display of the freshness information on the data as well as the data item for display enables a user to know whether the data item to be displayed is the latest one or has old contents, thus permitting him/her to confidently drive according to a guidance route provided by navigation.

In another preferred embodiment, the above-mentioned method may further comprise the acts of: searching for the data item specified through the database to extract the data item; judging whether the data is in the latest version; and generating a display screen by adding the freshness information on the data item according to a result of the judgment for data items. In the above-mentioned method, the freshness information may include information indicative of freshness of the data item for display. This may include date information.

Further, in the above-mentioned method, the freshness information may indicate whether the freshness of the data item for display is guaranteed, and may be displayed in a manner according to the freshness of the data item.

Moreover, in the above-mentioned method, the freshness information may include information indicating whether the data item for display is an additional item of information.

According to a preferred embodiment of the present invention, a computer program for displaying navigation information is provided, the computer program comprising instructions for causing a computer to update a database by receiving difference data and to display an item of data for display and freshness information, based on the difference data and storage contents in the pre-update existing database. Installing the program of the present invention in a vehicle navigation apparatus enables a user to know whether the data item to be displayed has the latest updated contents or old contents, thereby permitting him/her to confidently drive according to a guidance route provided by navigation.

BRIEF DESCRIPTION OF THE DRAWINGS

FIG. 5 is a diagram showing a display example of the vehicle navigation apparatus according to a preferred embodiment of the present invention.

FIG. 6 is a diagram showing another display example of the vehicle navigation apparatus according to a preferred embodiment of the present invention.

FIG. 9 is a diagram showing a further display example of the vehicle navigation apparatus according to a preferred embodiment of the present invention.

FIG. 10 is a diagram showing a still further display example of the vehicle navigation apparatus according to a preferred embodiment of the present invention.

FIG. 11 is a diagram showing a yet further display example of the vehicle navigation apparatus according to a preferred embodiment of the present invention.

FIG. 12 is a schematic diagram showing general transmission of difference data.

DETAILED DESCRIPTION OF THE PREFERRED EMBODIMENTS

Some preferred embodiments of the present invention will be described below in detail with reference to the accompanying drawings.

(Construction)

Figure 1:
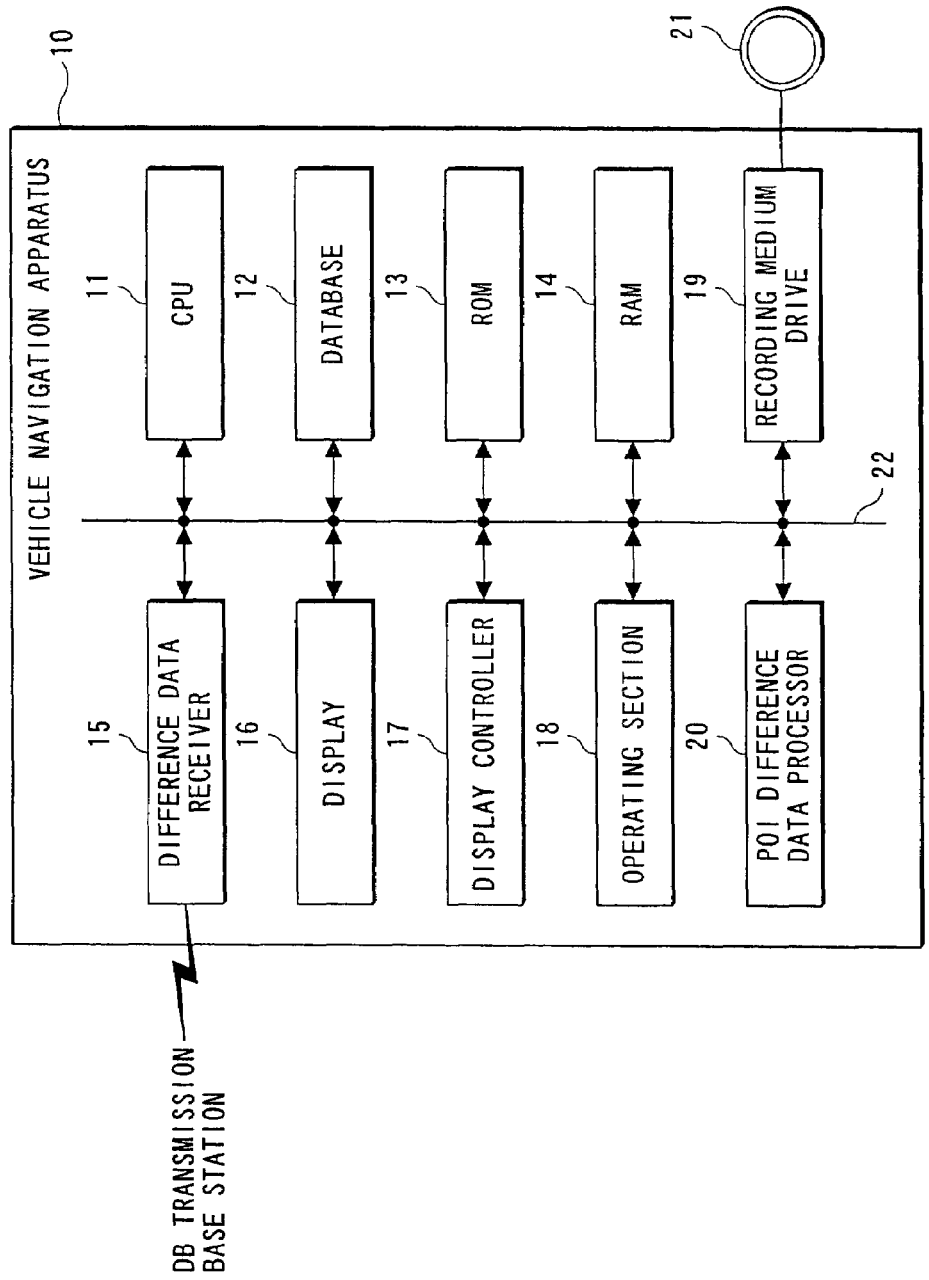
FIG. 1 is a block diagram showing the configuration of a vehicle navigation apparatus according to one preferred embodiment of the present invention.

FIG. 1 is a block diagram showing the configuration of a vehicle navigation apparatus according to one preferred embodiment of the present invention. It should be noted that in the present embodiment difference data received from a database transmission base station will be explained as POI difference data, but difference data about map information may be utilized. A vehicle navigation apparatus 10 as shown in the figure includes a CPU 11, a database 12, a ROM 13, a RAM 14, a difference data receiver 15, a display 16, a display controller 17, an operating section 18, a recording medium drive 19, and a POI difference data processor 20.

The CPU 11 performs arithmetic processing and controls each component in compliance with programs for executing various functions such as a navigation function or the like stored in the ROM 13 described later. The database 12 stores data for navigation such as road information data or POI data including POI difference data which is received by the difference data receiver 15 described later or which is read from a recording medium 21 described later by the recording medium drive 19. The ROM 13 stores the database 12 and the programs for executing various functions including the navigation function and the like. The RAM 14 temporarily stores arithmetic data, display data, and so on. The difference data receiver 15 receives the POI difference data transferred from the database transmission base station via a broadcast system such as a digital satellite broadcast, a digital ground wave broadcast, or a FM multiplex broadcast. The display 16 is composed of a liquid crystal panel or the like. The display controller 17 controls the display of map information including the POI data stored in the database 12 and of information for displaying a vehicle position, a guidance route, operating icons, and the like, according to the programs stored in the ROM 13. The operating section 18 is an input device including an operating button, a remote control button, a touch button, and the like. The recording medium drive 19 reads the POI difference data from the recording medium 21 such as a CD-ROM, a DVD or the like storing therein the POI data or the POI difference data. The POI difference data processor 20 manipulates the POI difference data. These components are connected to one another via an inner bus 22. In addition to the above-mentioned components, there are provided a GPS (global positioning system) detector for detecting the vehicle position, a gyro detector, a vehicle-speed pulse detector and the like.

Figure 2:
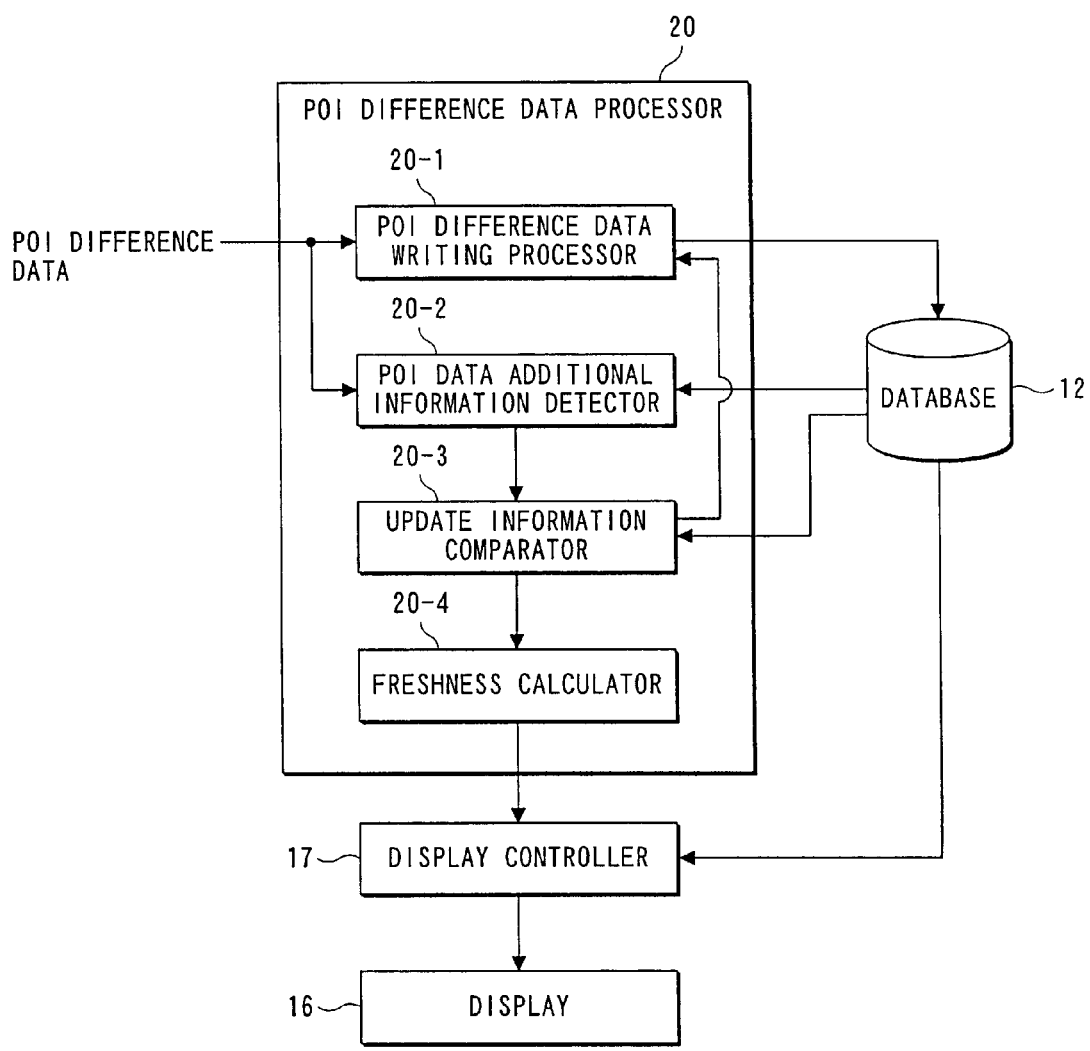
FIG. 2 is a block diagram showing the configuration of a difference data processor.

FIG. 2 is a block diagram showing the configuration of the difference data processor 20 of FIG. 1. Referring to FIG. 2, elements that are in common to FIG. 1 are given the same reference designator. In the figure, the POI difference data processor 20 includes a POI difference data writing processor 20-1, an additional information detector 20-2, an update information comparator 20-3, and a freshness calculator 20-4. The POI difference data writing processor 20-1 performs a writing operation of the POI difference data in the database 12, wherein data is received from the database transmission base station or read from the recording medium. The additional information detector 20-2 of the POI data detects additional information including an updating date, the value of version, a downloading date and the like from update information added to the POI data read from the database 12. The update information comparator 20-3 compares new update information added to the POI difference data with update information existing before receiving the POI difference data. Further, the freshness calculator 20-4 calculates freshness of information to be displayed according to a comparison result provided by the update information comparator 20-3.

According to the POI difference data processor 20 with such a structure, the POI difference data writing processor 20-1 writes in the database 12 the POI difference data received from the database transmission base station or read from the recording medium. Then, the POI data additional information detector 20-2 detects additional data from among the POI data given an instruction to search for by a user and read from the database 12 under control of the CPU 11. The update information comparator 20-3 compares new update information added to the POI difference data with update information existing before the POI difference data is written. Subsequently, the freshness calculator 20-4 calculates the freshness of the information for display based on the comparison result from the update information comparator 20-3. The display controller 17 executes display control processing of the display 16 so that the POI data is displayed on a screen together with its version value and its freshness as the additional data based on a predetermined program as shown in a display example described later.

Figure 3:
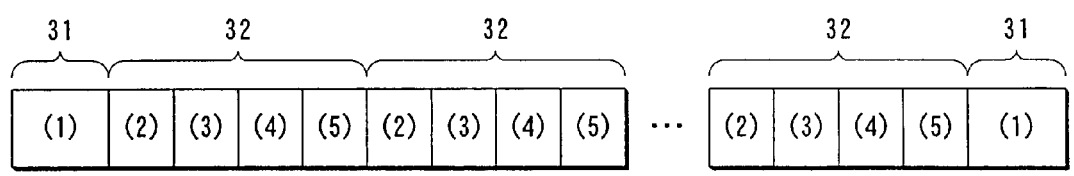
FIG. 3 is a diagram showing the data configuration of POI difference data.

Now, the data configuration of the POI difference data will be described below with reference to FIG. 3. The POI difference data which is sent through difference transmission and taken in comprises one header 31, a given number of difference POI data portions 32 following the header and connected to each other in sequence, and another header 31 following the data portions, all of which are connected together in a daisy chain manner. The header 31 stores update information on an information source (see (1) in the figure). The difference POI data portion 32 stores an information updating date (see (2) in the figure), a downloading date (see (3) in the figure), a section for information handling (see (4) in the figure), and individual POI data including data on a shop name, a telephone number, a positional information or the like, for example (see (5) in the figure). The update information on the information source is data expressed by a data version, for example, NTT2002.Ver.2.1, managed by the information source. The data on the information updating date relates to the updating date of the data in a database of the source, for example, data expressed by 2002.2.19. The data on the downloading date relates to the downloading date of the data in the database of the vehicle navigation apparatus. This downloading date may be added on a vehicle-mounted apparatus side. The information handling section is one for designating different appropriate processing depending on the updated state of the information (POI data) as described later. The updated state is as follows: 1) when POI data is added, for example, when a new shop opens; 2) when part of POI data is changed into another, for example, when a shop name is changed with its telephone number maintained; 3) when POI data is lost, for example, when a shop is closed. The POI data in the above-mentioned cases 2) and 3) is chosen when difference POI data is generated on a transmission station side. In other words, in the above case 2), although a telephone number of a shop is not changed, its name is changed. In the above case 3), an existing telephone number in pre-update POI data or POI data before updating is lost in the latest updated POI data.

(Operation)

Figure 4:
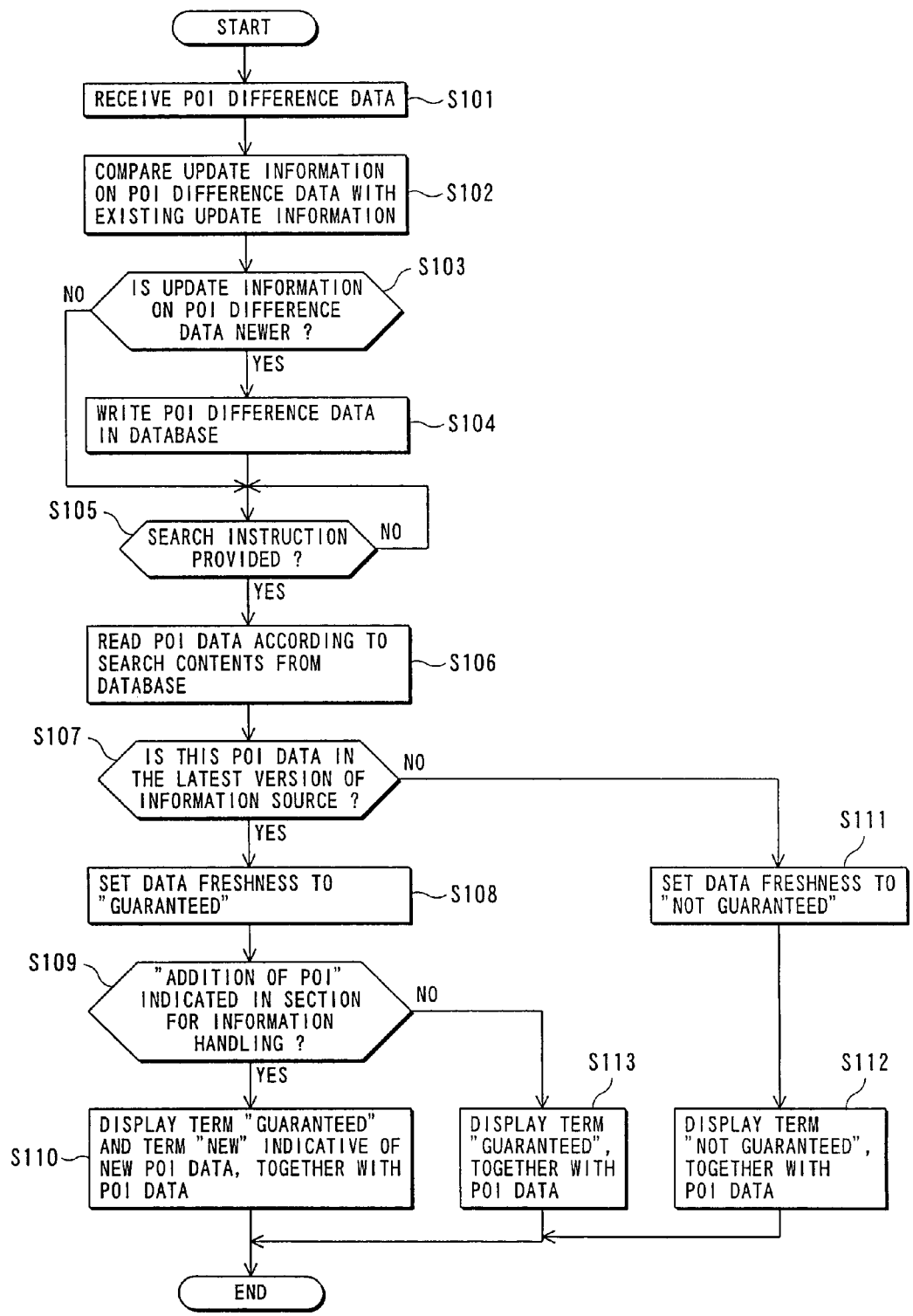
FIG. 4 is a flowchart showing the operation of display control performed by the vehicle navigation apparatus according to a preferred embodiment of the present invention.
Figure 7:
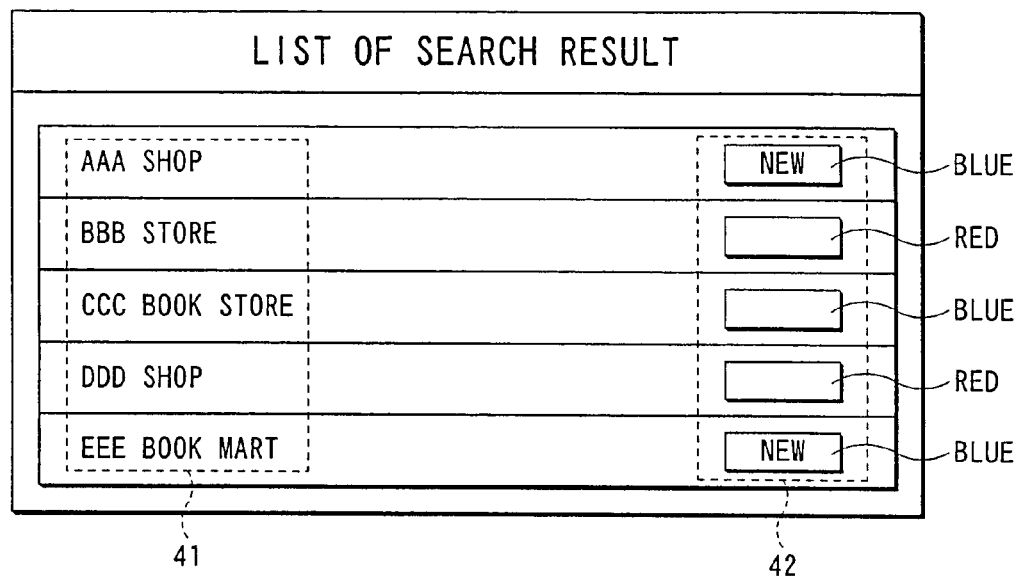
FIG. 7 is a diagram showing still another display example of the vehicle navigation apparatus according to a preferred embodiment of the present invention.
Figure 8:
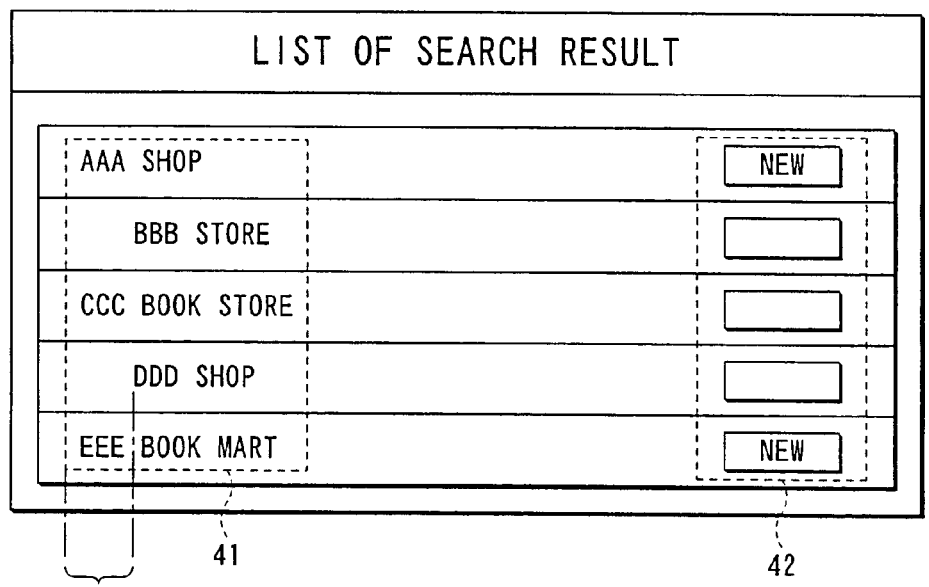
FIG. 8 is a diagram showing yet another display example of the vehicle navigation apparatus according to a preferred embodiment of the present invention.

The operation of display control performed by the vehicle navigation apparatus according to a preferred embodiment of the present invention will be explained below referring to an operation flowchart of FIG. 4, with the aid of FIGS. 1 to 3.

First, the database transmission base station updates actual POI data. For example, it adds a new shops and the like, changes a name of a shop or the like with its telephone number maintained, or cancels a closed shop or facility, by conducting field research of shops or the like and searching telephone numbers with a telephone book. There are many investigation commission companies for conducting such a research. The database transmission base station merges all investigation results supplied by these investigation commission companies into one database for transmission to offer a transmission service of the database. From the transmission database thus generated, the database transmission base station generates POI difference data which is applied to a difference transmission service. Then the database transmission base station carries out the transmission service to a vehicle navigation unit owned by each user, using the transmission means described above. Thus, the difference data receiver 15 receives the POI difference data transferred from the database transmission base station, or the recording medium drive 19 reads out the POI difference data stored in the recording medium 21 such as a CD-ROM, a DVD or the like which has been purchased by a user. At this time, the POI data additional information detector 20-2 of the POI difference data processor 20 detects update information on the POI difference data stored in the header 31 of the POI difference data taken in to supply it to the update information comparator 20-3 under instruction of the CPU 11. Then, the update information comparator 20-3 compares the update information on the POI difference data with existing update information in the database 12. When the update information on the POI difference data is newer or the latest compared with the database update information, the comparator 20-3 instructs the POI difference data writing processor 20-1 to write the taken POI difference data in the database 12 (acts S101, S102, S103; YES, and S104).

Thereafter, when the user gives an instruction for search or the like from the operating section 18 (act S105; YES), the CPU 11 performs processing corresponding to the user's search instruction in accordance with programs stored in the ROM 13, causing the display 16 to display a processing result via the display controller 17. At this time, POI data read from the database 12 accompanied by the processing result is supplied to the POI difference data processor 20 (act S106). Then, the POI data additional information detector 20-2 of the POI difference data processor 20 detects update information stored in the header 31 of the POI data supplied and determines whether the POI data read by the update information comparator 20-3 is updated data or not (act S 107). If it is the updated data, data freshness of this POI data is set to "GUARANTEED" (act S107; YES, act S108). And it is determined whether the aforesaid section for information handling designates "Addition of POI" or not (act S109). If no, a term "GUARANTEED" is displayed together with the POI data which is under processing (act S113).

FIG. 5 shows an example of a display screen. On the screen, a list of search result is displayed. The search result list is provided with the retrieved POI data, a POI data display column 41, and two freshness information display columns 42 and 43 for displaying freshness information. In the display column 42 is displayed a term "New" which indicates that the POI data is newly provided or supplied (that is, the POI data is not defined before updating the database). In the display column 43 is indicated whether it is guaranteed or not that the POI data is the latest. When guaranteed, the term "FRESHNESS: GUARANTEED" is displayed. In contrast, when not guaranteed, the term "FRESHNESS: NOT GUARANTEED" is displayed.

Returning to FIG. 4, in the act S 13, the POI data is displayed as is shown the POI data "CCC Book Store" in FIG. 5. The corresponding display column 42 is blank. If the determination in the act S109 results in YES, the term "GUARANTEED" and the term "New" indicative of new POI data are displayed, together with the POI data (act S110). For example, as is shown the POI data "AAA Shop" in FIG. 5, the term "New" is displayed in the display column 42, and the term "FRESHNESS: GUARANTEED" is displayed in the display column 43. If the determination in the act S107 results in NO, the data freshness is set to "NOT GUARANTEED" (act S111). And the term "NOT GUARANTEED" is displayed together with the POI data (act S112). In the example of FIG. 5, the POI data "BBB Shop" or "DDD shop" corresponds to the display provided in the processing of act S112.

As mentioned above, the navigation information displaying method of a preferred embodiment of the present invention utilizes acts S101 to S104 in which the difference data is received and the database is updated, and acts S105 to S112 in which not only the data item for display but also the freshness information on the data is displayed based on the above difference data and the storage contents of the database existing before updating. This method enables a user to know whether the data item to be displayed has the latest updated contents or old ones, thereby permitting him/her to confidently drive according to a guidance route provided by navigation.

In addition to the above-mentioned display example of FIG. 5, there may be provided many other embodiments having the different display of POI data, as shown in FIGS. 6 to 11. In the display example of FIG. 6, a guaranteed reliability bar, which designates the degree of reliability, for example, high or low degree, is provided. On this bar, a mark (∇ in the figure) is arranged at a position corresponding to the freshness of the POI data. In the display example of FIG. 7, a new display column 42 is assigned to every name display column 41 including a shop name and the like of POI data. For example, in the case of new updated POI data whose freshness is guaranteed, a frame "New" indicative of the new updated is colored blue, while in the case of non-updated POI data whose freshness is not guaranteed, a frame is colored red. The character "New" itself may be drawn in any color. In the display example of FIG. 8, based on update/non-update and guaranteed/not guaranteed freshness, a position of a shop name or the like located within a name display column 41 for shops and the like of POI data is shifted or deviates from the standard. Further, in the display example of FIG. 9, the size of an icon 44 which is described together with a shop name within a name display column 41 for shops and the like of POI data is varied depending on update/non-update and guaranteed/not guaranteed freshness. In the display example of FIG. 10, there is provided an updating-date display column 45 for displaying an updating date of the database every name display column 41 for shops and the like of POI data, so that this column designates the updating date. Moreover, as shown in FIG. 11, display items may be sorted according to a predetermined rule. For example, the display items are sorted and displayed in order of decreasing reliability or priority as desired by a user.

The present invention has been described above with the aid of examples of embodiments. Therefore, it is understood that the invention is not to be limited to the specific embodiment disclosed, and that various modifications are intended to be included within the scope of the appended claim.

What is claimed is:

1. A vehicle navigation apparatus comprising:
   a display;
   a database operable to store pre-update navigation data and difference data;
   a difference data receiver operable to receive difference data;
   a difference data processor configured to generate freshness information based on the received difference data and pre-update navigation data; and
   a display controller operable to generate images corresponding to map information, vehicle position, guidance information and freshness information for presentation on the display;

wherein the freshness information comprises a data string that corresponds to a reliability assessment for location data stored in the database.

2. The vehicle navigation apparatus of claim 1 wherein said difference data is point of interest (POI) data.

3. The vehicle navigation apparatus of claim 1 wherein said difference data receiver receives difference data from a broadcast system.

4. The vehicle navigation apparatus of claim 1 wherein said display, database, difference data receiver, difference data processor and display controller are connected with a communication bus.

5. The vehicle navigation apparatus of claim 1 wherein the freshness information is displayed with icons of different sizes, wherein each size corresponds to a different degree of reliability.

6. The vehicle navigation apparatus of claim 1 wherein said reliability assessment indicates whether information is guaranteed.

7. The vehicle navigation apparatus of claim 1 wherein the freshness information identifies if a location was not included in the pre-update navigation data.

8. The vehicle navigation apparatus of claim 1 wherein the freshness information includes an update date.

9. The vehicle navigation apparatus of claim 1 wherein the display controller generates a list including location names and freshness information for each location name.

10. The vehicle navigation apparatus of claim 1 wherein the freshness information is displayed in bar form indicating a degree of reliability.

11. The vehicle navigation apparatus of claim 1 wherein the freshness information is displayed in different colors, wherein each color corresponds to different degree of reliability.

12. A method for displaying navigation information, said method comprising the acts of:
providing a database, the database including pre-update navigation data;
receiving difference data for a location;
comparing the difference data with existing update information in the database; and
displaying a location name and freshness information for the location;
wherein the freshness information is a visual indication representative of the reliability of the navigation information displayed for the location.

13. The method of claim 12 wherein the difference data is Point of Interest (POI) data.

14. The method of claim 12 further comprising the acts of:
searching for and extracting navigation data corresponding to the location from said database;
evaluating whether the navigation data is the most current data for the location; and
displaying an indication that the information corresponding to the location is guaranteed if the navigation data is the most current data for the location.

15. The method of claim 12 further comprising the acts of:
evaluating whether the location was previously included in the database;
displaying an indication that the location is new if the location was not previously included in the database.

16. The method of claim 12 further comprising the act of generating a display screen including a list of locations and freshness information for each location.

17. The method of claim 16 wherein the freshness information is an indication whether the location information is guaranteed, a bar displaying relative reliability, an update date for the location information, a color adjustment in which each color indicates a different degree of reliability, or an icon that adjusts in size depending on the reliability of the location information.

* * * * *